United States Patent [19]

Pavey, Jr.

[11] 3,909,774

[45] Sept. 30, 1975

[54] CONTROLLED BUOYANCY SYSTEM FOR SEISMIC STREAMER SECTIONS

[75] Inventor: George M. Pavey, Jr., Dallas, Tex.

[73] Assignee: Whitehall Corporation, Dallas, Tex.

[22] Filed: July 25, 1974

[21] Appl. No.: 491,931

[52] U.S. Cl. ............... 340/7 PC; 340/7 R; 340/3 T; 340/8; 181/112; 114/235 B
[51] Int. Cl.² .................. B63B 21/00; B63B 21/56
[58] Field of Search ........ 340/3 T, 7 R, 7 PC, 8 PC, 340/115; 181/.5, 110, 112; 200/83 C; 114/235 B

[56] References Cited
UNITED STATES PATENTS

| | | | |
|---|---|---|---|
| 2,761,927 | 9/1956 | Szypolski | 200/83 |
| 3,371,739 | 3/1968 | Pearson | 340/7 R |
| 3,375,324 | 3/1968 | Miller | 340/7 PC |
| 3,385,391 | 5/1968 | McLoad | 181/15 |
| 3,611,975 | 10/1971 | Ashbrook | 114/235 B |
| 3,680,520 | 8/1972 | Smith | 114/235 B |
| 3,794,965 | 2/1974 | Charske | 340/7 PC |

Primary Examiner—Maynard R. Wilbur
Assistant Examiner—N. Moskowitz
Attorney, Agent, or Firm—Mason, Fenwick & Lawrence

[57] ABSTRACT

The subject matter of this application relates to a system for controlling the buoyancy of an elongated expansible, flexible liquid filled, marine seismic detection streamer by providing a pressure sensing switch assembly within the submerged streamer which includes a pressure sensing element exposed to the water pressure at the streamer depth and electrical contacts for operating an inlet valve and an exhaust valve upon downward or upward deviation of the streamer depth from a predetermined depth to admit additional quantities of a buoyancy control liquid from a supply line to the streamer to increase buoyancy or for discharging the control liquid from the streamer for decreasing buoyancy.

6 Claims, 6 Drawing Figures

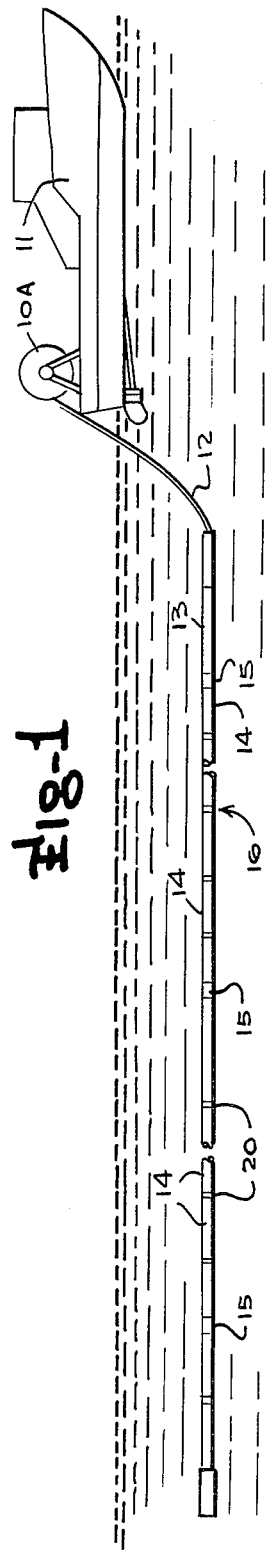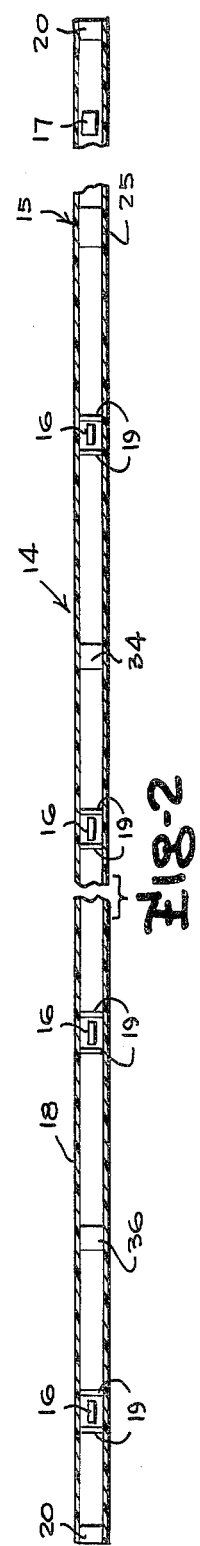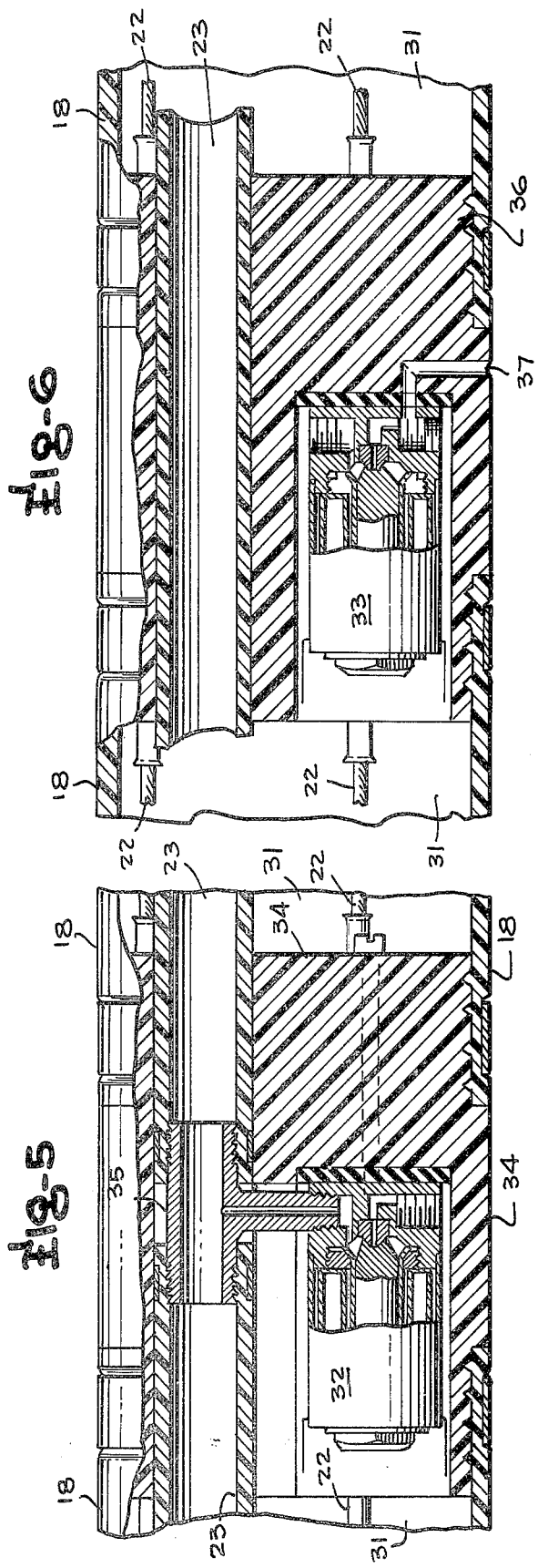

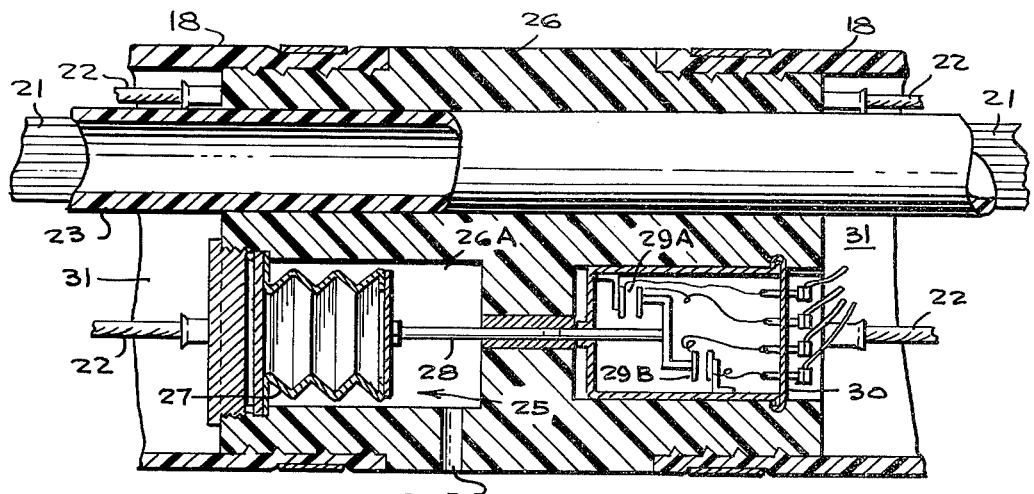
Fig-3
Fig-4
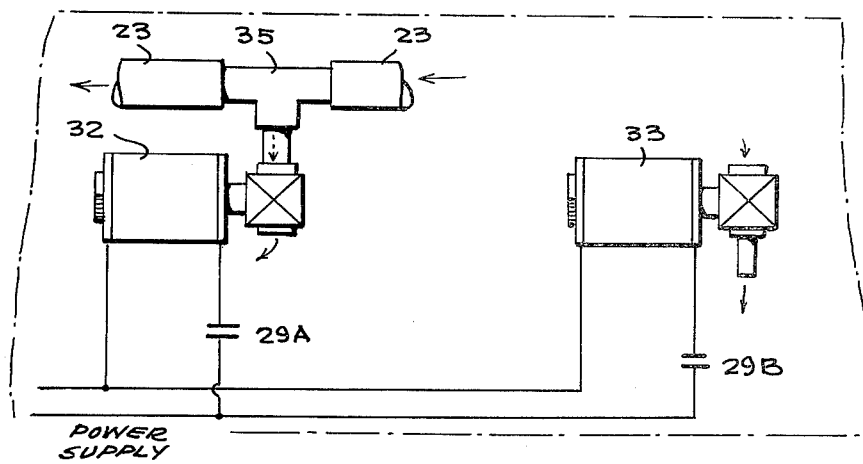

CONTROLLED BUOYANCY SYSTEM FOR SEISMIC STREAMER SECTIONS

BACKGROUND AND OBJECTS OF THE INVENTION

The present invention is related to that of my earlier application Ser. No. 332,816 filed Feb. 16, 1973 now abandoned, but employs buoyancy control liquid which is non-polluting and environmentally non-hazardous.

The present invention relates in general to marine seismic cable systems having means for maintaining the seismic cable or seismic streamer, or the individual sections thereof, at a predetermined depth. More particularly, the present invention relates to a buoyancy control system for seismic cable streamers formed of a plurality of serially connected sections filled with a buoyancy control liquid, having a pressure sensing switch within the streamer to sense the depth at which the streamer is operating and to operate an appropriate liquid admission or discharge valve if the streamer depth deviates from the desired depth to alter the buoyancy characteristics of the streamer and thereby maintain the same at the desired depth.

Heretofore, various systems have been devised for maintaining the hydrophones or transducers in an elongated flexible seismic streamer towed by a vessel at selected depths when being used in marine seismic surveying or exploring operations. In general, the marine seismic detection cable or streamer, the terms being used interchangeably, may include a lead-in cable and a plurality of serially connected active sections formed of a plastic tube filled with a buoyancy control liquid containing the hydrophones, stress members, structural spacers, transformer, and mechanical and electrical connectors, of the construction of the type generally disclosed in U.S. Pat. No. 3,371,739 granted Mar. 5, 1968 to Raymond H. Pearson. A marine seismic detection cable or streamer may in many cases be a mile or more in length, a typical streamer system being about 7000 feet long, and the efficiency of the seismic survey is effected to a large degree by the ability to maintain the various hydrophones along the length of the cable at the same predetermined depth.

Efforts have been made to maintain the seismic streamer at a selected predetermined depth in the water while the cable is being towed by the surveying vessel, by using a plurality of weights associated with the cable at spaced intervals to make the cable negatively buoyant and by associating flotation means with the cable to assist in maintaining the cable at the desired depth. Other efforts have been devoted to the provision of paravane structures which are secured to the seismic streamer and employ diving planes which are regulated in pre-selected relation to pressure responsive devices in the wall of the paravane to maintain a desired depth.

A system for variably controlling the buoyancy of a seismic detection streamer is disclosed in U.S. Pat. No. 3,371,739 granted to Raymond H. Pearson. The streamer is formed of a plurality of sections of neutrally buoyant liquid filled sections, having a control liquid inlet valve and a control liquid exhaust valve in each streamer section for controlling the amount of buoyancy control liquid within the streamer section and thereby maintaining a predetermined degree of buoyancy. Depth transducer devices are provided in the streamer sections for producing depth indicator signals whose frequency varies with depth and superimposing these signals on the hydrophone signals being transmitted to the towing vessel. In one embodiment, an operator on the towing vessel observes a depth indicator and manually adjusts switches on the towing vessel to remotely activate the valves in the streamer sections to properly adjust the buoyancy. In another embodiment, the depth indicating signals superimposed on the hydrophone signals activate a depth indicating circuit on the towing vessel to operate relays on the towing vessel for remotely regulating the valves in the streamer sections. For example, in both embodiments, buoyancy control liquid is added to the streamer section by the remotely activated liquid inlet valve to permit the control liquid to flow through an internal high pressure conduit from a pressurized reservoir on the towing vessel to increase buoyancy. Similarly, control liquid is removed from the streamer by remotely activating the outlet valve allowing control liquid to escape from the streamer and thus reducing the buoyancy. Certain disadvantages arise from such a remote control system, as separate depth indicators are employed in each streamer section and control voltages and depth indicator signals are superimposed on the conductors which carry the hydrophone signals, and the circuitry required in the system of the above-identified U.S. Pat. No. 3,371,739 is relatively complex as the detection of departures of the depth indicating signals from the selected reference depth and the circuit changes to activate the electric valves in the streamers are all accomplished on the towing vessel by remote control circuitry.

An object of the present invention is the provision of an improved buoyancy control system for controlling the depth of a neutrally buoyant seismic detection streamer filled with a buoyancy control liquid by sensing the depth at which the streamer is operating and directly operating an appropriate valve if the streamer depth deviates from the desired depth.

Another object of the present invention is the provision of an improved system for controlling the depth of a neutrally buoyant seismic detection streamer filled with a buoyancy control liquid by controlling the buoyancy thereof, wherein a pressure sensing switch is provided within the streamer section to sense the depth at which the streamer is operating and to directly operate an appropriate valve in the same streamer section by direct connection therewith in such section if the streamer depth deviates from the desired depth without requiring transmission of depth indicator signals to deviation indicating circuitry on the towing vessel and remote control circuitry on the towing vessel for supplying control voltages to be transmitted to the control valves in the streamer.

Other objects, advantages and capabilities of the present invention will become apparent from the following detailed description, taken in conjunction with the accompanying drawings illustrating preferred embodiments of the invention.

BRIEF DESCRIPTION OF THE FIGURES

FIG. 1 is a diagrammatic view of a seismic detection streamer system embodying the present invention, being towed by a vessel;

FIG. 2 is a diagrammatic side view of a portion of the seismic detection streamer;

FIG. 3 is a diagrammatic view of the pressure sensing switch employed in the streamer to sense depth and directly operate contacts controlling the buoyancy control liquid regulating valves;

FIG. 4 is a diagrammatic view showing the connection of the contacts with the valves and with the control liquid supply hose in the streamer; and FIGS. 5 and 6 are section views illustrating examples of the regulating valve assemblies and supports that may be used in the streamer.

DETAILED DESCRIPTION OF A PREFERRED EMBODIMENT

Referring to the drawings, wherein like reference characters designate corresponding parts, there is illustrated in FIG. 1, in diagrammatic form, a seismic detection streamer or cable 10 secured to a drum 10A and towed through fresh or sea water by a towing vessel, such as the vessel 11, at various preselected depths. The seismic detection streamer 10 includes a lead-in cable 12 which may have fairings and contain signal wires, strain cables, and other connection elements required for operation, followed by, for example, an elastic section 13, and active sections 14, one or more of which contain a depth control unit generally indicated at 15. Inactive sections may be interspersed in the streamer system as desired, and a conventional trailing device may be employed at the trailing end of the streamer. The general method of operation of such streamer cables in conducting seismic exploration is described in the prior Pasley U.S. Pat. No. 2,465,696, and the construction of the streamer sections may be generally of the structural nature illustrated in the prior Pearson U.S. Pat. No. 3,371,739 or the Pearson U.S. Pat. No. 3,660,809 filed June 29, 1970.

FIG. 2 illustrates diagrammatically a single active section 14, many of which are arranged in serial relation along the seismic detection streamer, and each of which has a plurality of hydrophone units 16 spaced in a selected arrangement or array along the streamer section. The outputs of the hydrophone units in a single section are usually connected in parallel and to an impedance matching transformer such as indicated at 17. The active section 14 is typically formed of an outer tubular jacket or hose which is flexibly expandable to some degree, formed for example of polyvinyl material, indicated generally at 18, surrounding a plurality of spacers 19 which may be disposed in various arrangements and located between end coupling members 20. For example, if the streamer section is constructed in the manner generally disclosed in the earlier Pearson U.S. Pat. No. 3,660,809 the spacers 19 may be arranged with a pair of such spacers located about six inches apart and then the next pair of spacers located about six feet further along the cable from the first mentioned pair. The spacers 19 are usually made of a rigid plastic material and have a plurality of holes through which are passed the plural signal conductors 21 and the strain cables 22. The spacers also aid in maintaining the cylindrical shape of the thick wall flexible outer tube or jacket 18. If the streamer sections are constructed in the manner illustrated in the Pearson U.S. Pat. No. 3,660,809, the pair of spacers located about six inches apart are maintained in such spaced relation by suitable means for holding the spacers against movement relative to the strain cables, for example by inserting solder into openings extending from exterior surfaces of the spacers to the apertures through which the strain cables pass, and a flexible mounting tube bears against and is supported between adjacent confronting surfaces of the spacers and fits about cylindrical hydrophone devices, all as disclosed in said patent application.

If the streamer section is of the construction illustrated in the Pearson U.S. Pat. No. 3,371,379, each active streamer section 14 will be formed of an outer tubular jacket and longitudinally spaced coupling members and float members and hydrophone spacers as generally illustrated in FIG. 7 of the Pearson patent. In either form of streamer section construction, the jacket or jacket segments will be sealed at each end to the end couplings or spacers through which the signal conductors, indicated by the reference character 21, and the supply hose or line indicated at 23 for supplying a buoyancy control liquid of different specific gravity from that of the water, for example sea water, in which the streamer is to be towed during geophysical prospecting, will extend in sealed relation through openings in the end couplings, and through suitable openings in the spacers or about cut-out portions in the spacers. Each streamer section will form one or more sealed chambers which are filled with a liquid having a density or specific gravity which is different from, preferably less than, that of the sea water in which the streamer is to be immersed to render the streamer substantially neutrally buoyant when filled with the control liquid and submerged within the sea water. The pressure of the control liquid within the streamer section is preferably sufficient to dilate or expand the streamer section jacket slightly from its initial assembled condition.

Although it has been customary heretofore to use oil as this buoyancy control liquid, and oil filled streamers have been long used in the seismic prospecting art, concern for avoiding oil pollution of waterways and shores impells the selection of other non-polluting liquids. Therefore, any non-hazardous liquid having a density or specific gravity other than that of sea water can be used as the buoyancy control liquid, an excellent example of which is fresh water when the streamer is to be used in sea water. Other examples on non- hazardous buoyancy control liquids which may be used, are alcohol and similar lighter-than-water non-hazardous liquids.

At a suitable location or locations along the streamer, for example at a location near the upstream end of the string of streamer sections 14, a pressure sensing switch assembly, such as is indicated generally by reference character 25 in FIG. 3 is provided in a pressure sensing switch support 26, or one of the end coupling members 20 may be constructed in the manner of the pressure sensing switch support 26. Referring to the diagrammatic illustration of FIG. 3, the pressure sensing switch support is of generally cylindrical configuration formed, for example, of plastic suitable for the purpose, which has bores extending therethrough for the strain cables 22 and signal conductors 21, and for the supply hose or line 23. The opposite end portions are, in one example, of slightly smaller diameter than the mid portion, and correspond substantially to the inner diameter of the jacket 18, to receive end portions of the jacket adjacent segments which are tightly fitted over the ends of the support 26 and clamped thereon by suitable clamping straps. Supported by the pressure sensing switch support 26 is a pressure sensing element, such as a bellows, indicated at 27, having a rod or linkage 28 connected to movable contact pairs or contactors 29A and 29B.

In one example illustrated in FIG. 3, the pressure sensing bellows 27 may be located in a cavity 26A in the supporting member 26 which is vented by aperture 26B to the exterior sea pressure and which is sealed from the liquid filled interior 31 of the streamer section. The rod or linkage 28 extends through and is movable in a suitable seal and is connected to the contactors 29A and 29B in a suitable container 30 in another cavity in the support member 26. The container 30 has exterior terminals to which wires are connected for electrically coupling the contactors in an appropriate circuit arrangement with a normally closed solenoid operated control liquid inlet valve, generally indicated at 32, and a normally closed solenoid operated exhaust valve 33, illustrated in FIG. 4.

The inlet valve 32 and exhaust valve 33 may be of the construction disclosed and arranged in the manner illustrated in the earlier Pearson U.S. Pat. No. 3,371,739 and incorporated in support structures as illustrated in FIGS. 5 and 6. For example, the inlet valve 32 may be incorporated in a generally cylindrical valve support member 34 which may be located at a desired position along the streamer section associated with the pressure sensing switch, the valve support member being provided with apertures extending therethrough within which are disposed the signal conductors 21, the strain cables 22, and the supply hose 23. The supply hose 23 is provided with a T-connector 35 for maintaining continuity of control liquid communication from the pressurized control liquid supply on the vessel to the next succeeding detection streamer section and with the inlet port of the normally closed solenoid actuated valve 32 disposed within a cavity formed in the valve support member 34. The outer casing of the inlet valve is generally cylindrical in configuration and somewhat less in diameter than the diameter of the cavity in the support member 34 to allow the control liquid flowing outwardly from the exhaust port of the valve, when the valve is operated, to pass into and mix with the control liquid within the chamber 31 of the streamer section.

An exhaust valve support 36, also of generally cylindrical configuration, is clamped in the same streamer section near the pressure sensitive switch, also having apertures for the signal wires, the strain cables, and the control liquid supply line. The exhaust valve support 36 also has a cavity in which is supported the normally closed solenoid operated exhaust valve 33, which in the illustrated embodiment may also have a smaller outer diameter than the inner diameter of the cavity in which it is housed. The exhaust valve 33 is substantially like the inlet valve 32, except that the inlet port of the exhaust valve 33 is in communication with the buoyancy control liquid surrounding the outer cylindrical surface of the valve and therefore with the liquid in the chamber 31 of the streamer section. The outlet port of the exhaust valve is in communication with an exhaust opening 37 in the support 36 which extends to the exterior of the streamer section to permit venting of oil from the chamber 31 within the jacket of the streamer section through the vent 37 to the outside of the streamer.

As illustrated in FIG. 4, the contactors A and B of the pressure sensing switch 25 are connected to the power supply conductors in the manner illustrated, with the contactor 29A controlling the power supply to the inlet valve 32 and the contactor 29B controlling the power supply to the exhaust valve 33. The pressure sensing bellows 27 is adjusted in a conventional manner to the desired depth at which the streamer is to operate, and the pressure of the buoyancy control liquid in the chambers 31 of the streamer sections will normally have been regulated to provide appropriate neutral buoyancy for the selected depth. The pressure sensing element 27 is preferably of a conventional adjustable type, and should be adjusted prior to launching to operate in a given depth range. It will be apparent that if the streamer descends to an increased depth, the bellows 27 reacts to close contactor 29A, which completes the supply circuit to inlet valve 32, opening this valve to add control liquid to the streamer and cause an increase in buoyancy. If the streamer rises to a shallower depth than that desired, the bellows 27 reacts to close the contactor 29B, which energized the solenoid controlled exhaust valve 33 to allow control liquid to escape from the chamber 31 of the streamer and cause the buoyancy to decrease. A suitable manual power supply switch is provided on the vessel so that, when the streamer is stored on ship or is otherwise far removed from its operating depth, the power supply can be turned off to avoid excessive loss of control liquid.

By this arrangement, the pressure sensing switch 25 within the streamer senses the depth at which the streamer is operating and directly operates the appropriate valve 32 or 33 if the streamer depth deviates from the desired depth. This represents a significant improvement over the much more complex arrangement disclosed in the earlier Pearson U.S. Pat. No. 3,371,739, as the present arrangement does not require a separate depth indicator in every streamer section or require control voltages and depth indicator signals to be superimposed on the signal carrying conductors extending to the vessel to activate remote control circuits on the vessel, which then in turn transmit control voltages to the solenoid operated valves in the streamer sections.

It will be apparent that a diaphragm type pressure sensing device, or similar conventional pressure sensing mechanisms, may be provided instead of the bellows device illustrated in the embodiment herein described. Also, the adjustment of the pressure sensing element may be controlled by command signals from the vessel, so that the pressure sensing element, or the plurality of pressure sensing elements if provided for plural sections, may be remotely controllable to set them for a new operating depth zone by command signals transmitted by a single pair of conductors to all of the pressure sensing elements.

What is claimed is:

1. An automatic buoyancy controlled streamer section for controlling the depth of adjacent portions of an elongated expansible flexible marine seismic detection streamer having serially connected sections containing a plurality of hydrophones therein and each filled with a buoyancy control liquid of different density from the density of the sea water in which the streamer is to be immersed to be towed continuously at a predetermined depth of submersion through the sea water by a vessel, the streamer section comprising an elongated hollow outer tubular jacket having a pressure sensing switch assembly located within the jacket of the streamer section including a pressure sensing device having a movable wall which has a first surface exposed to a reference pressure and an opposite surface exposed to the water pressure at the depth of the streamer to move in response to changes in water pressure of the sea water at the depth of the streamer section, first and second pairs of electrical contacts in the streamer section forming first and second switches, a first contact of each contact pair being a fixed contact and the second contacts of each contact pair being rigidly interconnected together for corresponding movement along a switch axis and being directly connected to said movable wall of said pressure sensing device to be actuated thereby, said contact pairs being in normally open condition and said first contacts of said contact pairs being spaced in opposite directions from their companion second contacts for electrically closing said first and second contact pairs respectively upon movement of the interconnected second contacts in first and second relatively opposite directions, a buoyancy control liquid supply line extending through the streamer section from a pressurized source of the buoyancy control liquid, a normally closed electrically operated inlet valve and a normally closed electrically operated exhaust valve disposed within the streamer section for admitting an additional quantity of the buoyancy control liquid from said supply line to the streamer for increasing the buoyancy thereof and for discharging the buoyancy control liquid from the streamer section for decreasing the buoyancy thereof respectively, and electrical circuit connections from an electrical power source through said first and second electrical contact pairs to said inlet valve and exhaust valve respectively by direct connections wholly located within the section between the contact pairs and said valves to operate said inlet valve and exhaust valve respectively responsive to closure of said first or second contact pairs by the movable wall of said pressure sensitive element upon downward or upward deviation respectively of the streamer depth from said predetermined depth.

2. An automatic buoyancy control system for a marine seismic detection streamer as defined in claim 1, wherein said pressure sensing device is a pressure sensing bellows exposed to the pressure of the water surrounding the streamer and having a stationary wall and an accordian side wall joined to the stationary wall and to said movable wall, and a rigid elongated rod slidably supported for axial movement connected at one end to said movable wall and having a rigid cross-connecting member connected to the other end of said rod and to said second contacts of said contact pairs for moving said second contacts responsive to movement of said movable wall.

3. An automatic buoyancy control system for a marine seismic detection streamer, as defined in claim 1, wherein said streamer includes a plurality of serially arranged streamer sections each having a buoyancy control unit therein comprising said pressure sensing device coupled to said first and second contact pairs and controlling said inlet and exhaust valves, said liquid supply line being common to each of said streamer sections, and the inlet valves of the buoyancy control units of all of the streamer sections being connected to said common liquid supply line for selectively admitting additional control liquid to their streamer sections.

4. An automatic buoyancy control system for a marine seismic detection streamer, as defined in claim 2, wherein said streamer includes a plurality of serially arranged streamer sections each having a buoyancy control unit therein comprising said pressure sensing device coupled to said first and second contact pairs and controlling said inlet and exhaust valves, said liquid supply line being common to each of said streamer sections, and the inlet valves of the buoyancy control units of all of the streamer sections being connected to said common supply line for selectively admitting additional control liquid to their respective streamer sections.

5. An automatic buoyancy controlled streamer section as defined in claim 1, wherein said pressure sensing switch assembly is supported by a generally cylindrical supporting body mounted in the streamer section in sealed relation to said jacket with opposite end portions encircled by the jacket, said cylindrical supporting body having first and second cylindrical chambers therein spaced from each other and communicating with each other through a sealed connector conduit, said first chamber housing said pressure sensing device and being sealed relative to the hollow interior of the streamer section jacket and being vented by a venting port to the exterior sea pressure to expose said movable wall to the exterior sea pressure communicated through the venting port, means housing said contact pairs in sealed relation in said second chamber of said cylindrical supporting body, and a connecting member extending through said connecting conduit and slidably supported for axial movement in sealed relation therein having one end connected to said movable wall and its other end connected to the interconnected second contacts of said contact pairs.

6. An automatic buoyancy controlled streamer section as defined in claim 2, wherein said pressure sensing switch assembly is supported by a generally cylindrical supporting body mounted in the streamer section in sealed relation to said jacket with opposite end portions encircled by the jacket, said cylindrical supporting body having first and second cylindrical chambers therein spaced from each other and communicating with each other through a sealed connector conduit, said first chamber housing said pressure sensing device and being sealed relative to the hollow interior of the streamer section jacket and being vented by a venting port to the exterior sea pressure to expose said movable wall to the exterior sea pressure communicated through the venting port, means housing said contact pairs in sealed relation in said second chamber of said cylindrical supporting body, and said rod extending through said connecting conduit and slidably supported for axial movement in sealed relation therein.

\* \* \* \* \*